United States Patent
Klump et al.

(10) Patent No.: US 7,987,770 B2
(45) Date of Patent: Aug. 2, 2011

(54) WATER PITCHER AND COVER THEREFORE

(75) Inventors: James M. Klump, Crestwood, KY (US);
Daniel Ryan Capelle, Corydon, IN (US); Norman J. Boulard, Louisville, KY (US); Jay Andrew Broniak, Louisville, KY (US); John Steven Holmes, Sellersburg, IN (US)

(73) Assignee: General Electric Company, Schenectady, NY (US)

( * ) Notice: Subject to any disclaimer, the term of this patent is extended or adjusted under 35 U.S.C. 154(b) by 1387 days.

(21) Appl. No.: 11/323,427

(22) Filed: Dec. 30, 2005

(65) Prior Publication Data

US 2007/0151979 A1 Jul. 5, 2007

(51) Int. Cl.
*A47J 31/06* (2006.01)
(52) U.S. Cl. ............... 99/297; 220/345.1; 220/345.4; 220/363; 220/912; 206/110; 206/181; 206/267; 206/758; 229/220; 229/125.12; 229/129.1; 222/131; 222/445
(58) Field of Classification Search .......... 220/912, 220/345.1–354.4, 351, 361, 363; 222/445, 222/131; 215/10, 12.1, 322; 16/361, 358–359; 206/110, 181, 267, 758; 229/220, 125.12, 229/129.1
See application file for complete search history.

(56) References Cited

U.S. PATENT DOCUMENTS

| | | | | | |
|---|---|---|---|---|---|
| 1,247,848 | A | * | 11/1917 | List, F. | 206/45.23 |
| 2,661,119 | A | * | 12/1953 | Spiess, Jr. et al. | 220/815 |
| 2,857,074 | A | * | 10/1958 | Hutterer | 220/315 |
| 3,861,565 | A | * | 1/1975 | Rickmeier, Jr. | 222/131 |
| 4,492,323 | A | | 1/1985 | Essen | |
| 4,655,373 | A | | 4/1987 | Essen | |
| 5,050,270 | A | * | 9/1991 | Burgei et al. | 16/298 |
| 5,273,194 | A | * | 12/1993 | McNamara | 222/470 |
| 5,405,034 | A | * | 4/1995 | Mittel, Jr. | 215/322 |
| 5,882,507 | A | * | 3/1999 | Tanner et al. | 210/85 |
| D415,922 | S | | 11/1999 | Kawasaki et al. | |
| D416,163 | S | | 11/1999 | Doritty et al. | |
| D421,361 | S | | 3/2000 | Coulson et al. | |
| D439,790 | S | * | 4/2001 | Matsushita et al. | D7/319 |
| D444,662 | S | | 7/2001 | McGrath et al. | |
| 6,318,579 | B1 | * | 11/2001 | Leess | 220/345.2 |
| 6,736,261 | B1 | * | 5/2004 | Thomas et al. | 206/265 |
| 6,752,287 | B1 | * | 6/2004 | Lin | 220/254.9 |
| 6,863,189 | B1 | * | 3/2005 | Teppe | 215/322 |
| D506,639 | S | | 6/2005 | Jalet | |
| 2002/0139802 | A1 | * | 10/2002 | Cross | 220/345.2 |
| 2004/0056035 | A1 | * | 3/2004 | Baker et al. | 220/345.1 |
| 2004/0206745 | A1 | * | 10/2004 | Timm | 219/432 |

* cited by examiner

*Primary Examiner* — Sang Y Paik
*Assistant Examiner* — Brett Spurlock
(74) *Attorney, Agent, or Firm* — Armstrong Teasdale LLP

(57) ABSTRACT

A pitcher includes a container body defining a liquid storage cavity therein and having an open end and a cover removably coupled to the container body. The cover extends along the open end, and the cover defining a fill opening configured to receive a liquid therein. The fill opening is in communication with the liquid storage cavity. The pitcher also includes a lid assembly having a lid closing access to the fill opening. A slide mechanism is coupled to the lid, and the slide mechanism is slidably coupled to the cover.

10 Claims, 3 Drawing Sheets

US 7,987,770 B2

WATER PITCHER AND COVER THEREFORE

BACKGROUND OF THE INVENTION

This invention relates generally to water pitchers and more particularly, to covers for water pitchers.

Some known water pitchers include multiple water chambers and a filtering mechanism therebetween. For example, at least some known water pitchers include an upper chamber and a lower chamber, with a filtering mechanism in flow communication with both the upper and lower chambers. The upper chamber is typically filled with water, and the water is channeled through the filtering mechanism to the lower chamber, such as by a gravity feed. A cover typically covers the opening to the upper chamber, and the cover generally includes a spout for pouring water from the water pitcher. In at least some known water pitchers, the upper chamber is filled by completely removing the cover, placing the water pitcher under a source of water, filling the upper chamber with water, and replacing the cover over the container.

However, conventional water pitchers have a number of drawbacks. For example, portions of the water pitcher may be misplaced or damaged upon removal of the cover to fill the water pitcher. Additionally, when the cover is removed, water accumulated on the cover may drip onto the countertop or other supporting surface during a water fill. Moreover, during a water fill, water may splash or spill out of the upper chamber.

To overcome some of these problems, at least some known water pitchers have covers designed to remain on the water pitcher during a water fill. These known water pitcher covers typically include a hinged portion that is opened during a water fill.

However, it may be difficult or uncomfortable for a user to open the hinged portion. For example, the user may have to use two hands, or set the pitcher down to open the hinged portion. Additionally, it may be cumbersome to maneuver the water pitcher under a faucet for a water fill when the hinged portion is in the open position. Additionally, the hinged portion may be recessed or raised with respect to the remaining portion of the cover. Dirt or debris may be collected within the recessed portion of the cover.

Furthermore, some known water pitcher filtering mechanisms include a removable filter cartridge. The filter cartridges are typically replaced after a predetermined amount of time or usage. At least some known water pitchers have indicators or charts which inform a user that a replacement is needed. However, these indicators are typically included within the upper chamber or on the cartridge itself. A user may not become aware that a filter change is needed because of the position of the indicator. Removing the filter too late results in poor filtering and reduced quality water.

Some known existing water pitchers have capped spouts over the water pouring opening. With such capped spouts, and when pouring water from the pitcher, water may build up at the spout and surge out, especially if the cover were to stick.

BRIEF DESCRIPTION OF THE INVENTION

In one aspect, a pitcher is provided including a container body defining a liquid storage cavity therein and having an open end and a cover removably coupled to the container body. The cover extends along the open end, and the cover defining a fill opening configured to receive a liquid therein. The fill opening is in communication with the liquid storage cavity. The pitcher also includes a lid assembly having a lid closing access to the fill opening. A slide mechanism is coupled to the lid, and the slide mechanism is slidably coupled to the cover.

In another aspect, a cover for a container is provided, wherein the cover includes a cover body configured to be removably coupled to the container. The cover body defines a fill opening configured to receive a liquid therein, and the fill opening is in communication with the container. The cover also includes a guide track extending from the cover body, and the guide track includes a guide slot therein, wherein the guide slot extends along a non-linear path. A lid assembly includes a lid closing access to the fill opening, and a slide mechanism coupled to the lid. The slide mechanism is slidably coupled to the guide track via the guide slot.

In a further aspect, a method is provided for assembling a cover for a container having a liquid storage cavity and an open end opening to the liquid storage cavity, wherein the cover extends along the open end of the container. The method includes providing a cover body configured to be removably coupled to the container, wherein the cover body includes a fill opening configured to receive a liquid therein. The method also includes coupling a guide track to the cover body, wherein the guide track includes a guide slot therein, and the guide slot extends along a non-linear path. The method includes providing a lid assembly including a lid configured to close access to the fill opening when the lid is in a closed position, and a slide mechanism coupled to the lid, and slidably coupling the slide mechanism to the guide track via the guide slot.

DETAILED DESCRIPTION OF THE INVENTION

Figure 1:
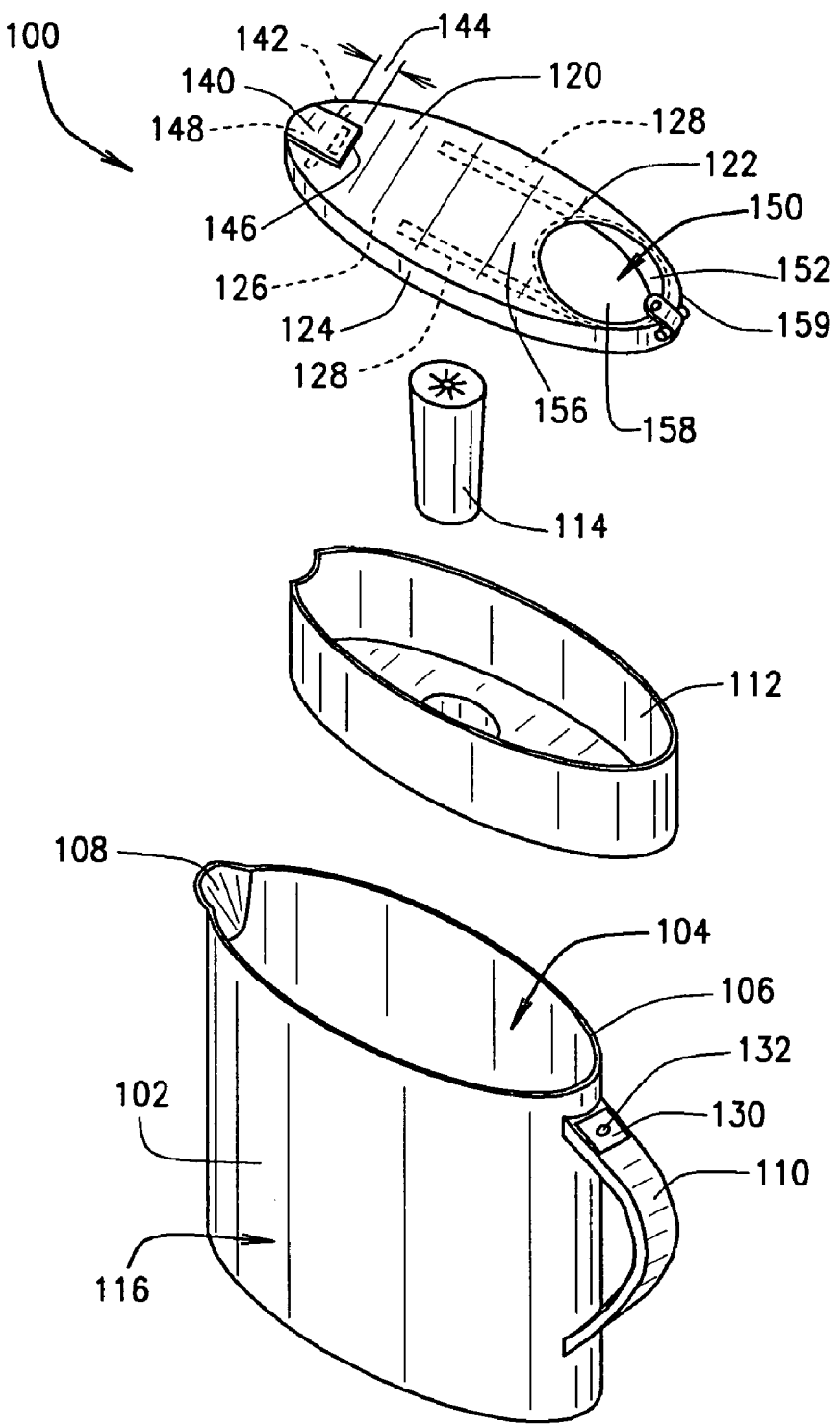
FIG. 1 is an exploded perspective view of an exemplary water purification pitcher.

FIG. 1 is an exploded perspective view of an exemplary water purification pitcher or container 100. Pitcher 100 includes a container body 102 defining a liquid storage cavity 104 therein. Container body 102 also defines an open top end 106 for accessing liquid storage cavity 104. Container body 102 defines a pour spout 108 at top end 106. Pour spout 108 is generally positioned at a forward end of container body 102, or the end generally away from a user. Water is delivered from pitcher 100 via pour spout 108. In alternative embodiments, container 100 includes a spigot (not shown) for dispensing the water therefrom. The spigot is generally positioned proximate a bottom of container body 102. A handle 110 extends from container body 102 and is positioned proximate top end 106 of container body 102. In the exemplary embodiment, handle 110 is integrally formed with container body 102 generally opposite pour spout 108, or at a rearward end of container body 102.

Container body 102 is fabricated from a durable, rigid material such as a plastic material. However, in alternative embodiments, container body 102 is fabricated from a glass material, a metal material, or the like. Container body 102 has an oval shape. In alternative embodiments, container body 102 has other shapes, such as circular, rectangular, frusto-conical, irregular shapes, or the like.

Pitcher 100 includes an upper chamber or reservoir 112 received within liquid storage cavity 104. Upper chamber 112 is positioned proximate open top end 106 of container body 102. A filter mechanism 114 is positioned at a lower portion of upper chamber 112. Filter mechanism 114 is positioned between upper chamber 112 and the remaining portion of liquid storage cavity 104, also referred to hereinafter as a lower chamber 116. Water in upper chamber 112 is separated from water in lower chamber 116. Upper chamber 112 and lower chamber 116 are in fluid communication with one another via filter mechanism 114. In the exemplary embodiment, filter mechanism 114 is a gravity or drip filter such that unpurified water is channeled from upper chamber 112, through filter mechanism 114, and into lower chamber 116.

Pitcher 100 includes a cover 120 that is removably coupled to container body 102. Cover 120 extends along open top end 106 and has a similar shape as top end 106. Cover 120 includes a fill opening 122 extending therethrough. Fill opening 122 is configured to receive water during the filling of pitcher 100. In the exemplary embodiment, a rim 124 extends from a bottom portion 126 of cover 120 and engages container body 102. Rim 124 facilitates positioning cover 120 with respect to container body 102. In the exemplary embodiment, flanges or guide tracks 128 (shown in phantom in FIG. 1) also extend from bottom portion 126. Guide tracks 128 extend parallel to one another. Guide tracks 128 are spaced apart from one another, and surround at least a portion of fill opening 122. In the exemplary embodiment, guide tracks 128 extend longitudinally along cover 120, such as in a direction from the rearward end to the forward end.

In the exemplary embodiment, pitcher 100 includes a filter mechanism monitor 130. In the exemplary embodiment, monitor 130 is a timer for indicating a suggested filter change. Timer may be reset upon each filter change. In another embodiment, monitor is a flow meter for monitoring an amount of water filtered by filter mechanism 114. In the exemplary embodiment, monitor 130 includes an indicator 132, such as, for example, an LED, for indicating a need for a filter change. Monitor 130 is coupled to handle 110. As such, monitor 130 may be readily visible to a user.

In the exemplary embodiment, monitor 130 includes a controller (not shown), such as a microprocessor, for controlling indicator 132. The controller operates indicator 132 when a filter change is needed, such as for example, after a predetermined amount of water is filtered or after a predetermined amount of time has elapsed since the previous filter change. Additionally, in the exemplary embodiment, the controller records the on time of indicator 132 and determines or estimates when a battery from indicator 132 needs replacement or a remaining battery capacity. For example, the battery is capable of powering indicator 132 for a predetermined maximum amount of time, such as, for example, twenty days. The controller determines how long the indicator has been turned on for each filter change. After a predetermined amount of time, such as a time that is less than the maximum amount of time, controller operates indicator 132 in a battery change mode of operation. In the exemplary embodiment, indicator 132 is flashed or pulsed at a first rate during the filter change indication mode of operation and indicator 132 is flashed or pulsed at a second rate during the battery change indication mode of operation. Alternatively, indicator 132 is flashed or pulsed using different colored LED's for each mode, or different LED's are flashed or pulsed for each mode.

In the exemplary embodiment, a spout lid 140 is coupled to cover 120 to close access to pour spout 108. Spout lid 140 is pivotably coupled to cover 120 by pins 142 (shown in phantom in FIG. 1). Pins 142 are positioned a distance 144 from a rear end 146 of spout lid 140. Additionally, spout lid 140 includes a counterweight 148 (shown in phantom in FIG. 1) positioned rearward of pins 142. Counterweight 148 facilitates pivoting spout lid 140 while pitcher 100 is being tilted, such as when water is being poured from pitcher 100. In the exemplary embodiment, spout lid 140 is pivoted prior to water engaging spout lid 140 during pouring of water from pitcher 100.

Pitcher 100 includes a lid assembly 150 coupled to cover 120. Lid assembly 150 includes a lid 152 and a slide mechanism 154 (shown in FIG. 2). Lid 152 closes access to fill opening 122. In use, lid 152 is moved from fill opening 122 to provide access to upper chamber 112. In the exemplary embodiment, lid 152 is slidably coupled to cover 120 and lid 152 is moved along a top surface 156 of cover 120 from an open position to a closed position. When lid 152 is in the closed position, a top surface 158 of lid 150 is flush with top surface 156 of cover 120. During use, lid 152 is moved generally toward the forward end of cover 120, such as in the direction of pour spout 108, when lid 152 is moved from the closed position to the open position. Additionally, lid 152 is moved generally toward the rearward end of cover 120, such as in the direction of handle 110, when lid 152 is moved from the open position to the closed position. In the exemplary embodiment, lid 152 includes a depression 159 at the rearward end of lid 152. Depression 159 provides a surface for a user to exert an opening force against, for example, by a users thumb.

Slide mechanism 154 extends from lid 152 and engages guide tracks 128. In the exemplary embodiment, lid assembly 150 is slidably coupled to guide tracks 128 via slide mechanism 154.

Figure 2:
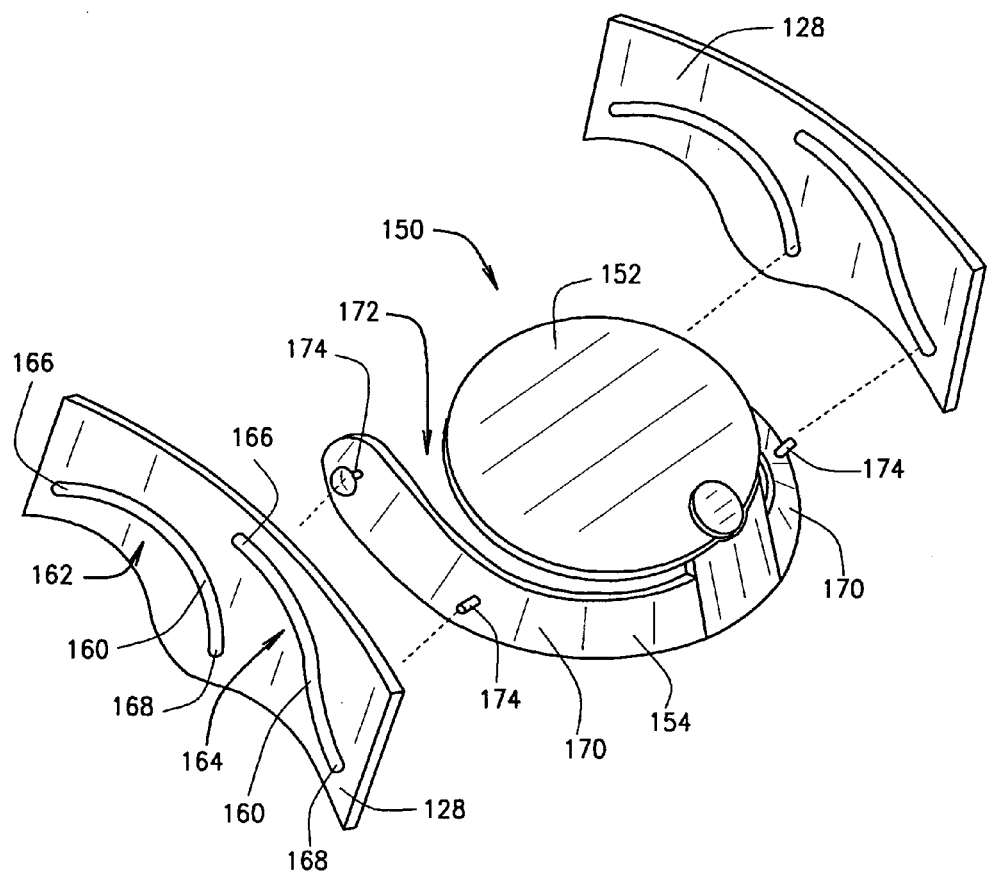
FIG. 2 is a perspective view of an exemplary lid assembly that may be used with the water purification pitcher shown in FIG. 1.

FIG. 2 is a perspective view of lid assembly 150 engaging guide tracks 128. Guide tracks 128 include guide slots 160. In the exemplary embodiment, each guide track 128 includes a forward guide slot 162 and a rearward guide slot 164. In the exemplary embodiment, each guide slot 160 is non-linear and includes both a horizontal component and a vertical component along its length. For example, each guide slot 160 may include a first slot portion and a second, non-parallel, slot portion extending from the first slot portion at a predetermined angle. Additionally, in some embodiments, each guide slot 160 may include more than two slot portions, and the slot portions may be angled with respect to one another or may be connected by radiused portions. In the exemplary embodiment, guide slots 160 extend between a forward end 166 and a rearward end 168. Ends 166 and 168 define motion limits for slide mechanism 154. In the exemplary embodiment, each guide slot 160 is arcuate or curved along its length between ends 166 and 168 and is curved in multiple directions. In the exemplary embodiment, forward guide slot 162 has a different shape than rearward guide slot 164. Alternatively, each guide slot 160 is identical in shape. In other alternative embodiments, each guide track 128 includes a single guide slot 160. In one alternative embodiment, each guide track 128 is linear and extends at an oblique angle with respect to cover 120 (shown in FIG. 1) such that lid 152 is moved in a non-parallel direction with respect to cover 120.

Slide mechanism 154 includes legs 170 extending from lid 152. Legs 170 are spaced apart from lid 152 such that a gap 172 is created between each leg 170 and lid 152. During use, cover 120 is received within gap 172 to facilitate movement of lid 152. A brace (not shown) may extend between each leg 170 for support of legs 170. In the exemplary embodiment, guide members 174, such as pins, extend outward from each leg 170 and engage guide slots 160. In the exemplary embodiment, two guide members 174 extend outward from each leg 170 and engage forward guide slots 160 and rearward guide slots 164, respectively. Guide members 174 may be retained within guide slots 160 by a rim on guide members 174.

Figure 3:
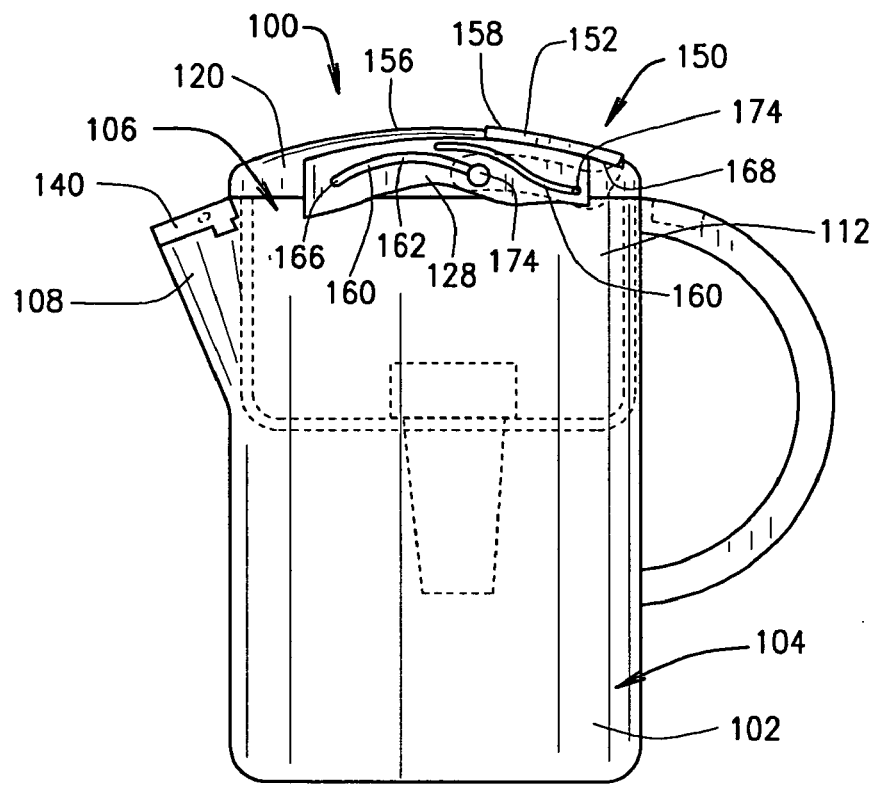
FIG. 3 is a partially broken-away side view of the water purification pitcher shown in FIG. 1 with the lid assembly of FIG. 2 in a closed position.
Figure 4:
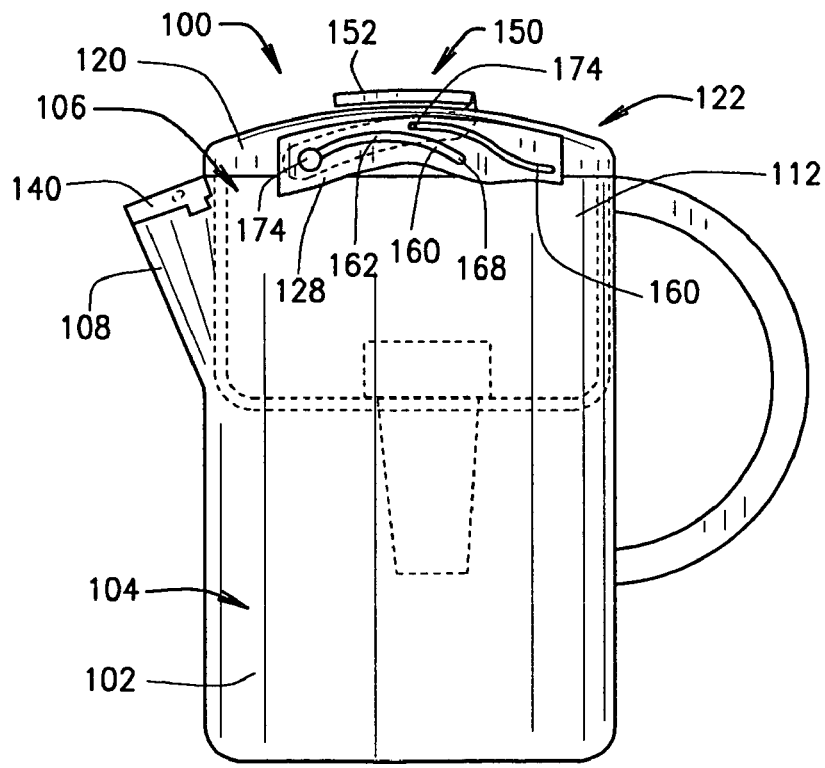
FIG. 4 is a partially broken-away side view of the water purification pitcher shown in FIG. 1 with the lid assembly of FIG. 2 in an open position.

FIG. 3 is a partially broken-away side view of pitcher 100 with lid assembly 150 in a closed position. FIG. 4 is a partially broken-away side view of pitcher 100 with lid assembly 150 in an open position. As illustrated, upper chamber 112 is received in liquid storage cavity 104 of container body 102. Cover 120 extends along open top end 106 of container body 102. When cover 120 is installed on container body 102, spout lid 140 covers pour spout 108.

As illustrated in FIG. 3, a portion of cover 120 is removed such that lid assembly 150 and guide tracks 128 may be shown. When lid assembly 150 is in the closed position, lid 152 is seated within fill opening 122 of cover 120. Additionally, top surface 158 of lid 152 is flush with top surface 156 of cover 120. Guide members 174 are located at rearward ends 168 of guide slots 160.

During use, lid 152 of lid assembly 150 is moved generally forward to the open position (shown in FIG. 4). Specifically, as force is exerted in a forward direction to lid assembly 150, the forward end of lid 152 is moved generally upward and forward with respect to cover 120. For example, forward guide slot 162 has an initial generally upwardly sloped portion to facilitate raising the forward end of lid 152 during an initial movement. Additionally, each guide slot 160 has a lateral or horizontal component or portion to facilitate moving lid 152 forward along top surface 156 of cover 120. As such, lid 152 may be slid along top surface 156 of cover 120 to the open position, shown in FIG. 4, thus allowing access to fill opening 122.

As illustrated in FIG. 4, a portion of cover 120 is removed such that lid assembly 150 and guide tracks 128 may be shown. When lid assembly 150 is in the open position, lid 152 is in a forward-most position. Additionally, guide members 174 are located at forward ends 166 of guide slots 160. To move lid 152 to the closed position, a force is exerted on lid 152 in a generally rearward direction. Guide members 174 are moved along guide slots 160 to rearward ends 168 of guide slots 160.

A pitcher is thus provided in a cost effective and reliable manner. The pitcher includes a cover having a fill opening, such that the cover may remain attached to the container body during the filling operation. A lid closes access to the fill opening. The lid is slidably coupled to the cover such that the lid may be pushed to an open position. The lid is moved along the top surface of the cover. As such, the various components of the pitcher remain attached to the pitcher during water fills, thus reducing the risk of loss or damage to the components. Additionally, The opening of the lid is accomplished in an effective and reliable manner. For example, the lid may be opened with one hand of the user because the lid is positioned adjacent the handle. However, when the lid is in the closed position, the lid is flush with the top surface of the cover. As a result, the risk of dirt and debris collecting on either the lid or the cover is reduced. As a result, a pitcher cover is provided in a cost effective and reliable manner.

Exemplary embodiments of water purification pitchers as associated with water purification are described above in detail. The methods and apparatus are not limited to the specific embodiments described herein nor to the specific water purification pitcher designed and operated, but rather, the methods of designing and operating water purification pitchers may be utilized independently and separately from other methods and apparatus described herein or to designing, installing and operating components not described herein. For example, other components can also be designed, installed and operated using the methods described herein.

While the invention has been described in terms of various specific embodiments, those skilled in the art will recognize that the invention can be practiced with modification within the spirit and scope of the claims.

What is claimed is:

1. A pitcher comprising:
   a container body defining a liquid storage cavity therein and having an open end;
   a cover removably coupled to said container body, said cover extending along said open end, said cover defining a fill opening configured to receive a liquid therein, said fill opening in communication with said liquid storage cavity; and
   a lid assembly comprising a lid slidably coupled to said cover, said lid comprising a plurality of support members extending from said lid, each of said support members comprising a plurality of guide members configured to engage a respective guide track coupled to said cover enabling said lid to slide along a top surface of said cover to close access to said fill opening;
   wherein said cover comprises a first track and a second track opposite said first track, each of said first track and said second track comprising a plurality of guide slots extending along generally arcuate paths, wherein said guide members are movable within the corresponding guide slots.

2. A pitcher in accordance with claim 1 wherein said lid is movable between an open position and a closed position, said fill opening is accessible when said lid is in the open position and access to said fill opening is restricted when said lid is in the closed position.

3. A pitcher in accordance with claim 1 further comprising:
   an upper chamber received in said container body proximate said open end, said upper chamber in communication with said fill opening of said cover, and said upper chamber configured to receive the liquid therein; and
   a filter mechanism separating said upper chamber from said liquid storage cavity, said filter mechanism configured to filter the liquid.

4. A pitcher in accordance with claim 1 further comprising a handle extending from said container body, said fill opening positioned proximate said handle.

5. A pitcher in accordance with claim 1 further comprising at least one of a filter mechanism monitor and a filter mechanism timer.

6. A pitcher in accordance with claim 5 wherein said filter mechanism monitor comprises an indicator and a controller, said controller configured to operate said indicator in at least one of a filter change mode of operation and a battery change mode of operation.

7. A pitcher in accordance with claim 1 further comprising:
   a pour spout defining an outlet for the liquid in said liquid storage cavity; and
   a spout lid covering said pour spout, said spout lid pivotably coupled to said cover, and wherein said spout lid comprises a counter-weight such that said spout lid is pivoted upon tilting of said container body.

8. A cover for a container, said cover comprising:
   a cover body configured to be removably coupled to the container, said cover body defining a fill opening configured to receive a liquid therein, said fill opening in communication with the container;

a first guide track and a second guide track opposite said first guide track, each of said first guide track and said second guide track extending from said cover body, each of said first guide track and said second guide track comprising a plurality of guide slots extending along generally arcuate paths; and a lid assembly comprising a lid closing access to said fill opening, said lid comprising a plurality of support members extending from said lid, each of said support members comprising a plurality of guide members configured to engage a respective guide slot.

9. A cover in accordance with claim 8 wherein said lid is slidable along a top surface of said cover body.

10. A method of assembling a cover for a container having a liquid storage cavity and an open end opening to the liquid storage cavity, wherein the cover extends along the open end of the container, said method comprising:

providing a cover body configured to be removably coupled to the container, wherein the cover body includes a fill opening configured to receive a liquid therein;

coupling a first guide track and a second guide track to the cover body, wherein each of the first guide track and the second guide track include a plurality of guide slots extending along generally arcuate paths;

providing a lid assembly including a lid configured to close access to the fill opening when the lid is in a closed position, the lid including a plurality of support members extending from the lid, each of the support members including a plurality of guide members extending therefrom and movable within a corresponding guide slot; and slidably coupling the plurality of support members to each of the guide tracks by engaging the plurality of guide members in a respective guide slot.

* * * * *